Nov. 26, 1968    R. W. ASTHEIMER    3,413,468
MEANS FOR IMPROVING THE OPTICAL GAIN OF AN INFRARED DETECTOR
Filed Feb. 14, 1966

*INVENTOR.*
ROBERT W. ASTHEIMER
BY Joseph Levinson

United States Patent Office 3,413,468
Patented Nov. 26, 1968

3,413,468
MEANS FOR IMPROVING THE OPTICAL GAIN OF AN INFRARED DETECTOR
Robert W. Astheimer, Westport, Conn., assignor to Barnes Engineering Company, Stamford, Conn., a corporation of Delaware
Filed Feb. 14, 1966, Ser. No. 527,163
2 Claims. (Cl. 250—83)

ABSTRACT OF THE DISCLOSURE

A hollow, truncated, internal reflecting cone is closed on its truncated end by a truncated, conical plug of material which has a high refractive index and transmits the wavelengths of infrared radiation desired to be detected. An infrared detector is immersed on the truncated end of the plug, and the detector is separated from the reflecting cone by the length of the plug.

---

This invention relates to a radiometric device, and more particularly to an immersed detector device for detecting optical radiations, especially in the infrared.

Detection of infrared radiation, particularly in the longer wavelengths, is often difficult because the amount of radiation available for measurement is small, and the detectors are not as sensitive as other types of optical radiation detectors, for example, those available for the measurement of radiation in the visible spectrum. Thermistor bolometers, which are useful as infrared detectors in the longer wavelengths, are subject to the above drawbacks. Detector size is one key factor to the sensitivity of a thermistor bolometer. In general, the response of a thermistor bolometer varies inversely as the square root of its area. To minimize the size of detector elements, the immersed thermistor bolometer, such as is shown and described in Wormser Patent No. 2,983,888, which is assigned to the assignee of the present invention, was developed. In this type of bolometer the detector element is in optical contact with an immersion lens which increases the detector's sensitivity by an amount approaching the refractive index of the lens material. With hyperimmersed detectors it is possible to obtain gains in detector sensitivity even greater than the refractive index of the lens materials. However, the properties required of immersion lens materials for thermistor bolometers are very critical. To be effective, the material must transmit the desired wavelengths and have a high index of refraction to obtain useful immersion gain. Furthemore, the lens material must have a high thermal conductivity to act as a heat sink for the thermistor flake. Germanium and silicon have the required properties, and perform well as immersion lenses, but at wavelengths in the longer infrared, such as 15 microns and up, the efficiency of these lenses drops because of absorption. Of course, the thicker lenses which are required to obtain the immersion gain provide a longer absorbing optical path length for the radiation desired to be detected, and in such a case the absorption problem becomes greater and more objectionable. The absorption problem may be dealt with by the use of reflecting cones to condense the radiation onto the detector. One such use is illustrated in application Ser. No. 156,817, now Patent No. 3,271,575, which is assigned to the assignee of the present invention. However, such a system suffers in that the maximum optical gain achievable is only about one half that which may be obtained by the use of immersing a detector in germanium or silicon. The reason for this is that the image is formed in air rather than in a high-refractive-index medium.

Accordingly, it is an object of the present invention to improve the optical gain of infrared detectors.

A further object of this invention is to provide an immersed detector device with less optical absorption and improved long-wavelength performance.

In carrying out this invention, an immersed detector device is provided having a truncated, internal reflecting cone which is terminated in a truncated conical plug. A radiation detector is mounted on the truncated end of the conical plug.

The invention, together with further objects and advantages thereof, may best be understood with reference to the following description taken in connection with the accompanying drawings, in which.

Figure 1:
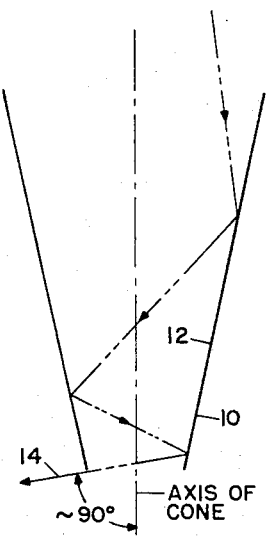
FIG. 1 is a diagram of a reflecting cone used for explanatory purposes.

One method of achieving optical gain is shown in FIG. 1 in the form of a cone 10 having an inner reflective surface 12. An internal reflecting cone of this type is used to obtain the maximum optical gain which is possible in air. This is achieved when the extreme emergent rays 14 are normal to the axis of the cone 10 as shown in FIG. 1. The cone 10 is equivalent to an $f/0.5$ optical system. Any subsequent reflection would cause the rays 14 to go back out the wide end of the cone 10. This, of course, is not desirable. As has been previously pointed out, the maximum optical gain achievable by the internal reflective cone 10 is only about half that which may be obtained using an immersed lens technique.

Figure 2:
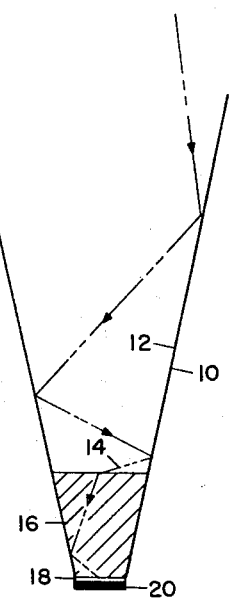
FIG. 2 is a diagram of the immersed detector device embodied in this invention.

In FIG. 2 the truncated internal reflecting cone 10 is continued beyond the truncated end as shown in FIG. 1 in the form of a truncated conical plug 16. Accordingly, the truncated end of cone 10 is terminated in a truncated conically shaped plug or immersion cone 16. The plug 16 is made of a material having the properties required for immersion lenses, namely, a high refractive index, high thermal conductivity, and the material must be able to transmit the wavelengths of radiation desired to be detected. Germanium and silicon are examples of such materials. The material used, of course, will depend upon the ultimate utilization of the device. The truncated surface of the plug 16 has mounted thereon a thermistor detector 20 by an immersion glass layer 18 which is constructed in a conventional manner.

The cone 10 is thus terminated in a conical plug 16 of immersion material having a high refractive index, e.g., germanium. The two exposed surfaces of the plug 16 are plane, parallel, and normal to the axis of the cone 10. Extreme rays leaving the air portion of the cone 10 refract into the plug at an angle of approximately 14.5°. This permits additional cone condensing action to be achieved within the plug section of the cone until the rays again emerge normal to the axis of the cone. The total optical gain is now $0.5/4 = 0.125$. Accordingly, radiation which would be reflected out the wide end of the cone is now applied to the detector 20. The amount of radiation which may be further condensed by the action of the plug is limited by an acceptance angle of about ±37° which is established by the immersion glass layer 18. Therefore the cone is only extended to provide the optical gain achievable with such limitations. Since an ordinary immersion lens is subject to the same restriction, the optical gain achieved by the plugged section of the cone would be comparable to that achieved in an immersed detector.

Figure 3:
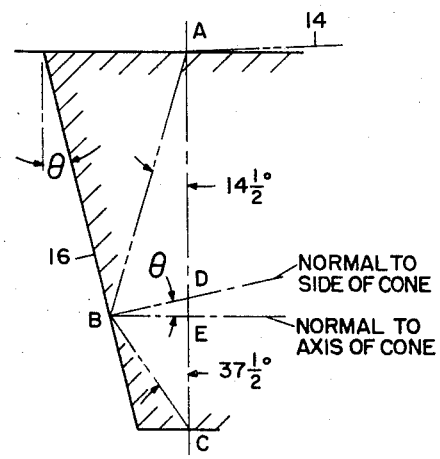
FIG. 3 is a diagram showing the geometry used in calculating the immersion cone angle.

An optimum angle and length exists for the plug or solid cone 16. These depend upon the index of refraction of the material. Using explanatory FIG. 3, the cone angle for germanium will be computed. The extreme rays for the air portion of the cone strike the solid cone at grazing incidence and these rays, after one internal reflection, should be incident on the detector at the critical angle of 37½°. Therefore, with the requirement that $$\angle BAC = 14\tfrac{1}{2}°$$

and $$\angle BCA = 37\tfrac{1}{2}°$$

then $$\angle ABC = 180° - 37\tfrac{1}{2}° - 14\tfrac{1}{2}° = 128°$$

$$\angle ABD = 128° \times \tfrac{1}{2} = 64°$$

$$\angle ABE = 90° - 14\tfrac{1}{2}° = 75\tfrac{1}{2}°$$

$$\theta \text{ (cone angle)} = \angle ABE - \angle ABD = 11\tfrac{1}{2}°$$

It should be noted that the cone angle will not, in general, be the same for air cone 10 and solid cone or plug 16. The air cone angle is determined by the $f/$ number of the objective lens and the field of view, while the immersion cone angle depends only upon the index of refraction of the material used for the plug 16.

Figure 4:
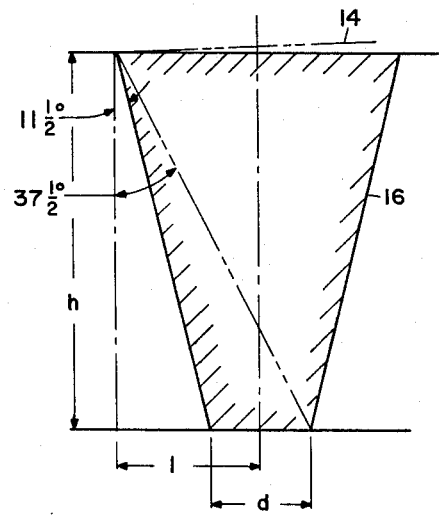
FIG. 4 is a diagram showing the geometry used in determining immersion cone length.

The optimum length of the immersion cone or plug 16 is determined by the detector size. The geometry is shown in FIG. 4. A grazing incidence ray entering the immersion cone will be reflected off the side so as to be incident on the exit aperture at the critical angle as described above. The plug 16 should be long enough so that when this ray is incident on one edge of the entrance aperture, it passes through the extreme opposite edge of the detector 20. When this condition is fulfilled, all rays entering the cone over a hemisphere will pass through the detector end at incidence angles equal to or smaller than the critical angle. If the immersion plug is shorter, the detector size will be larger than optimum, while if it is longer, some rays will exceed the critical angle and vignetting will result.

Using FIG. 4, the length of the immersion plug or cone 16 is calculated as follows:

$$h \tan 37\tfrac{1}{2}° = 1 + d/2$$

$$h \tan 11\tfrac{1}{2}° = 1 - d/2$$

where $h$ = length and $d$ = detector diameter.
Add:

$$h = \frac{2}{\tan 37\tfrac{1}{2}° + \tan 11\tfrac{1}{2}°} = 2.06$$

$$d = 2h \tan 37\tfrac{1}{2}° - 2 = 1.16$$

Therefore: $h = 1.78d$

Hemispherical immersed detectors usually use a lens radius of at least 10 times the detector diameter to prevent excessive vignetting and hyperimmersed detectors require an even greater thickness. Since the thickness required for an immersion cone plug is only 1.78 times the detector diameter, the present invention allows a reduction in thickness of immersion lens material by a factor of at least 5 and usually more.

By combining the desirable characteristics of the internal reflecting cone and the immersed detector, improved optical gain is achieved. An additional advantage to this technique is that the thickness of the plug 16 can be much less than an immersion lens of an immersed detector, since a large portion of the optical gain is achieved in the open section of the cone. Since large immersion lenses provide long absorbing optical path length, the thin plug of immersion material utilized in the present invention will provide a shorter path length with less absorption for long wavelength infrared with an improved result with respect to long wavelength detection.

What I claim is:
1. A means for improving the optical gain of an infrared detector comprising
   (a) a hollow, truncated cone having internal reflecting surfaces for collecting and condensing infrared radiation to its truncated end,
   (b) a solid, truncated conical plug of a material having a high refractive index which transmits the wavelengths of infrared radiation desired to be detected, and
   (c) an infrared detector immersed on the truncated end of said conical plug,
   (d) said conical plug positioned to close and terminate said hollow, truncated cone such that radiation collected and condensed by said hollow, truncated cone is applied through said plug to said infrared detector.
2. The structure set forth in claim 1 wherein said truncated conical plug consists of germanium or silicon.

References Cited
UNITED STATES PATENTS

| | | | |
|---|---|---|---|
| 2,788,708 | 4/1957 | Williamson | 250—83.3 |
| 2,964,636 | 12/1960 | Cary | 250—211 |
| 3,175,092 | 3/1965 | Leftwich | 250—83.3 |
| 3,271,575 | 9/1966 | Falbel | 250—216 |

RALPH G. NILSON, *Primary Examiner.*

S. ELBAUM, *Assistant Examiner.*